United States Patent [19]

Zemanek, Jr.

[11] Patent Number: 4,674,067

[45] Date of Patent: Jun. 16, 1987

[54] METHOD AND APPARATUS FOR GENERATING LOW FREQUENCY ACOUSTIC ENERGY WAVES

[75] Inventor: Joseph Zemanek, Jr., Duncanville, Tex.

[73] Assignee: Mobil Oil Corporation, New York, N.Y.

[21] Appl. No.: 817,641

[22] Filed: Jan. 10, 1986

[51] Int. Cl.⁴ ............................................. G01V 1/00
[52] U.S. Cl. ..................................... 367/25; 367/159; 367/166; 367/912; 181/102
[58] Field of Search ................. 367/25, 159, 166, 167, 367/169, 911, 912, 171, 172, 155, 156, 157; 181/101, 102, 106

[56] References Cited

U.S. PATENT DOCUMENTS

| | | | |
|---|---|---|---|
| Re. 24,446 | 3/1958 | Summers | 181/5 |
| 2,868,311 | 1/1959 | Tullos | 367/912 X |
| 3,018,466 | 1/1962 | Harris | 367/171 |
| 3,333,238 | 7/1967 | Caldwell | 340/18 |
| 3,362,011 | 1/1968 | Zemanek, Jr. | 340/18 |
| 3,768,069 | 10/1973 | Abbagnaro | 367/174 X |
| 4,383,308 | 5/1983 | Caldwell | 367/31 |
| 4,450,544 | 5/1984 | Denaro et al. | 367/176 |

OTHER PUBLICATIONS

L. E. Kinsler and A. R. Frey, *Fundamentals of Acoustics,* John Wiley & Sons, Inc., Apr. 1958, pp. 198-207, 244-247.

*Primary Examiner*—Charles T. Jordan
*Assistant Examiner*—John W. Eldred
*Attorney, Agent, or Firm*—Alexander J. McKillop; Michael G. Gilman; George W. Hager, Jr.

[57] ABSTRACT

An acoustic transmitter is employed in a borehole logging tool for generating low frequency acoustic energy waves. A tube of piezoelectric material is sealed at both ends and filled with liquid. A pliable boot surrounds such piezoelectric tube. At least one passageway communicates the inside of the piezoelectric tube with the inner surface of the boot. Differing electrical polarities are applied to the inner and outer surfaces of the piezoelectric tube. These electrical polarities are modulated to excite the piezoelectric tube to resonate at a frequency controlled by the inertia of the liquid in the passageway and the mass of the liquid inside the piezoelectric tube.

11 Claims, 4 Drawing Figures

FIG. 2
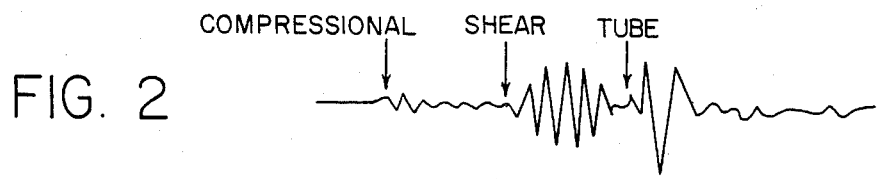
FIG. 4A
FIG. 4B
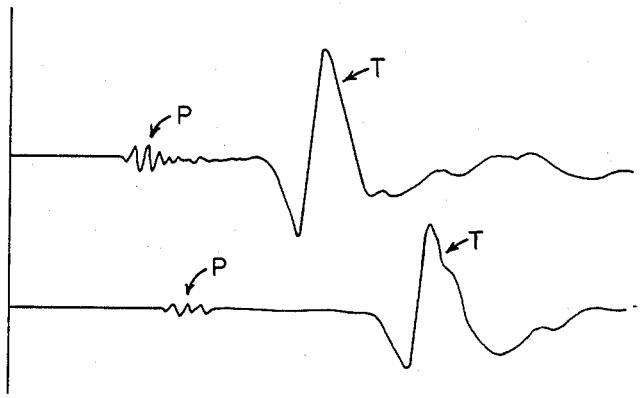

METHOD AND APPARATUS FOR GENERATING LOW FREQUENCY ACOUSTIC ENERGY WAVES

BACKGROUND OF THE INVENTION

This invention relates to an acoustic velocity logging method and apparatus for generating low frequency acoustic energy waves, particularly predominant tube waves in the seismic frequency range.

In acoustic borehole logging, an acoustic energy transmitter and one or more receivers disposed at spaced-apart distances from the transmitter are included in a borehole logging tool that is moved through a borehole. Acoustic energy waves generated by the transmitter travel through the subsurface formations surrounding the borehole and are detected by the receiver or receivers. One such borehole logging tool is described in U.S. Pat. No. 4,383,308 to R. L. Caldwell.

Typically, acoustic energy waves provided by conventional borehole logging tools include both head-waves and guided waves. A first arriving event is a headwave, commonly called a compressional wave, which represents acoustic energy which has been refracted through the formation adjacent the wellbore. This compressional wave travels as a fluid pressure wave in the wellbore mud from the transmitter to the formation where it travels at the compressional wave velocity of the particular formation. The compressional wave then travels to the receiver through the wellbore mud as a fluid pressure wave.

A second arriving event is a headwave, commonly called a shear wave, which is also refracted through the formation adjacent the wellbore. Unlike the compressional wave, the shear wave travels at shear velocity through the formations. The particles of the formation along the path of propagation are vibrated in a direction perpendicular to the direction of the propagation of the wave.

A third arriving event is the guided wave, commonly called a tube wave or Stoneley wave, which causes a radial bulging and contraction of the borehole, and its travel is by way of the borehole wall; that is, the boundary between the borehole fluids and the formation solids.

A fourth arriving event is the guided wave, commonly called a normal mode, pseudo-Rayleigh wave, or reflected conical wave. The travel of this normal mode is restricted to the borehole and has an oscillatory pattern normal to its direction of travel. Normally, the shear wave is indistinguishable from the onset of this normal mode due to concurrent arrival times.

Various signal timing and wave front analysis methods have been suggested for distinguishing between these various wave fronts received at a given receiver. Most of these methods involve timing circuits which anticipate the receipt of, and facilitate the collection of, such wave front information. For descriptions of various logging techniques for collecting and analyzing acoustic wave data, please refer to U.S. Pat. Nos. 3,333,238 (Caldwell); 3,362,011 (Zemanek, Jr.); Re. 24,446 (Summers); and 4,383,308 (Caldwell).

Heretofore, well logging tools have transmitted such acoustic energy waves at frequencies of several kilohertz, while conventional seismic energy waves have been obtained at much lower frequencies of a few hundred hertz or less. It is a specific feature of the present invention to provide an acoustic transmitter for use in a borehole logging tool that will produce acoustic energy waves in the typical seismic frequency range of a few hundred hertz or less, particularly tube waves with predominant energy levels over those of the compressional, shear and normal mode acoustic energy waves.

SUMMARY OF THE INVENTION

In accordance with the present invention, there is provided a method and apparatus for generating low frequency acoustic energy waves in subsurface formations surrounding a borehole. An acoustic transmitter employs a tube of piezoelectric material enclosed at both ends and filled with liquid. The piezoelectric tube is surrounded by a pliable boot. At least one passageway is provided from inside the piezoelectric tube to the inner surface of the boot. The passageway is small enough to allow static pressure changes into said piezoelectric tube, but not large enough to allow dynamic pressure changes above a certain resonant frequency into said piezoelectric tube. The piezoelectric tube is placed in a borehole logging tool and lowered into a borehole. Differing electrical polarities are applied to the inner and outer surfaces of the piezoelectric tube to excite the piezoelectric tube to vibrate and thereby produce a low frequency acoustic energy wave in the formations surrounding the borehole.

In a more specific aspect, the inertia of the liquid in the passageway and the mass of the liquid inside the piezoelectric tube are selected to provide the desired resonant frequency. Increasing either such inertia or such mass causes a decrease in the resonant frequency of the piezoelectric tube. Decreasing either such inertia or such mass causes an increase in the resonant frequency of the piezoelectric tube. The step of changing inertia is preferably carried out by changing the number of passageways but can also be carried out by changing the diameter of such passageways. In one embodiment of the invention, low frequency predominant tube waves in the order of 500 hertz were generated.

BRIEF DESCRIPTION OF THE DRAWINGS

FIG. 2 illustrates a set of acoustic energy waveforms that are typically transmitted through subsurface formations surrounding a borehole as the logging tool of FIG. 1 is advanced through a borehole.

FIGS. 4A and 4B are acoustic energy waveforms that might be received by a pair of spaced-apart receivers in the logging tool of FIG. 1 illustrating the predominant low frequency acoustic energy tube wave generated in accordance with the present invention.

DESCRIPTION OF THE PREFERRED EMBODIMENT

Figure 1:
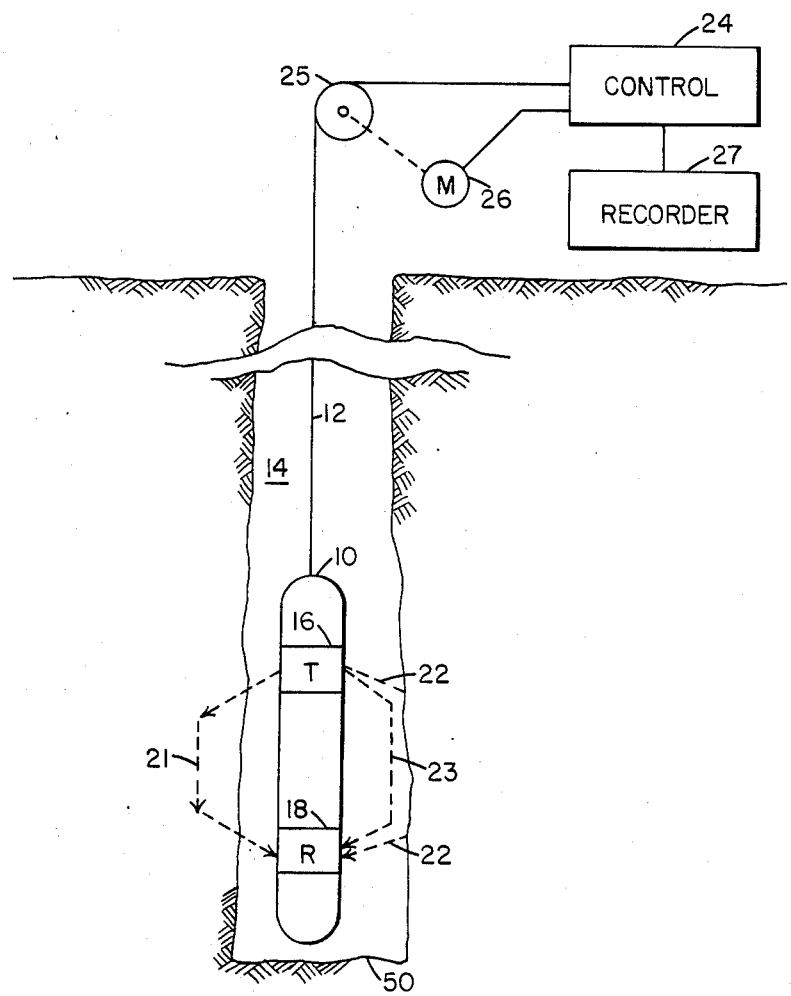
FIG. 1 is a diagramatic representation of a borehole acoustic velocity logging system which may be utilized to generate acoustic energy waves in subsurface formations.

Referring now to FIG. 1, there will firstly be described a conventional borehole acoustic velocity logging system with which the acoustic transmitter of the present invention may be utilized. The simplest acoustic logging system consists of a single transmitter and receiver. The logging tool 10 is suspended by cable 12 for movement along the length of the borehole 14. The logging tool includes an acoustic source or transmitter 16 for the production of repetitive time-spaced pulses of acoustic energy. One or more acoustic detectors or receivers 18 detects the generated acoustic pulses after their travel through the surrounding formations and converts them into representative electrical signals. The uphole components include a surface control unit 24 to which the cable 12 is directed over the sheave 25. A motor 26, which is controlled from the surface control unit 24, operates the sheave 25 for raising and lowering the logging tool 10 in the borehole 14. An output means, such as a digital recorder 27, is electrically connected to the surface control unit for recording and/or displaying the data detected from the logging tool 10. For more details and a more thorough understanding of the uphole recording of the acoustic waves detected by a borehole logging tool as shown in FIG. 1, reference may be made to U.S. Pat. Nos. 3,333,238 (Caldwell); 3,362,011 (Zemanek, Jr.); Re. 24,446 (Summers); and 4,383,308 (Caldwell).

In carrying out the borehole logging operation, the logging tool 10 of FIG. 1 is initially lowered to the vicinity of the bottom 50 of the borehole 14. The acoustic source or transmitter 16 is energized. Some of the generated acoustic energy will be received directly by the receiver 18 as compressional and shear waves by way of path 21 adjacent the borehole; as tube waves by way of path 22 along the borehole wall; and as the normal mode by way of path 23 within the borehole. FIG. 2 is representative of a set of such acoustic waveforms as they might be received by the receiver 18 as the logging tool is advanced through the borehole. Compressional and tube waves are identified as P and T waves, respectively. Since the shear wave is indistiguishable from the onset of the normal mode due to concurrent arrival times at the receiver, both are identified together as S waves in FIG. 2.

After the recording of these acoustic waves, the arrival times of selected ones of said waves is determined. The arrival time of a particular wave type at the same receiver changes slowly as the logging tool is advanced through the borehole. Thus, the arrival time at the current depth point is very close to the arrival time at the next successive depth point. It is desirable to carry out the borehole logging operation by advancing the tool at a speed such that the arrival time at the next depth point is always less than a half-wave period away. This defines the time window on the next trace within which to look for the wave type arrival.

Figure 3:
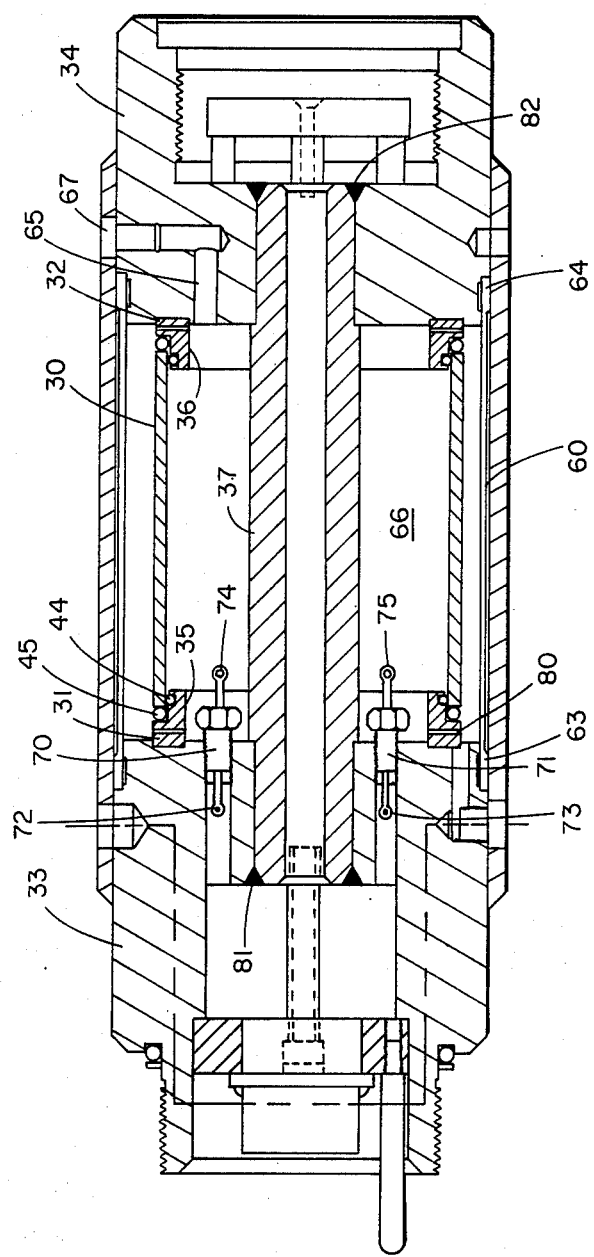
FIG. 3 is a detailed cross-sectional view of an acoustic transmitter employed in the logging tool of FIG. 1 to generate low frequency tube waves in accordance with the present invention.

Having now described a borehole logging system with which the acoustic transmitter of the present invention may be utilized, FIG. 3 may now be referred to along with the following description of such acoustic transmitter. A tube of piezoelectric material 30 is supported by housings 33 and 34. In one embodiment, such support is through ring members 31 and 32 which are slidably mounted about recessed portions 35 and 36 of housings 33 and 34, respectively. Housing 33 includes a protruding portion, or mandrel 37, which extends through the center of piezoelectric tube 30 and is affixed to housings 33 and 34 by welds 81 and 82, respectively.

Ring member 31 is grooved to receive O-rings 44 and 45. O-rings 44 and 45 seal piezoelectric tube 30 to ring member 31 and mechanically isolate piezoelectric tube 30 from ring member 31. In similar manner, ring member 32 is grooved to receive O-rings 54 and 55. O-rings 54 and 55 seal piezoelectric tube 30 to ring member 32 and mechanically isolate piezoelectric tube 30 from ring member 32.

A boot 60 comprised of a pliable material, such as rubber, for example, surrounds tube 30 and is fixed in place about housings 33 and 34 by means of springs or wire wrappings 63 and 64, respectively.

A passageway 65 is provided for filling the inner chamber 66 of tube 30 surrounding mandrel 37 with a liquid, such as an oil, for example. A set screw 67 seals the liquid in place. Excess liquid is placed in the space between boot 60 and tube 30 to allow for expansion and contraction of boot 60.

Electrical feed throughs 70 and 71 are engaged with housing 33 to provide pressure isolation between inner chamber 66, which is at ambient pressure, and atmospheric pressure inside the tool. Feed through 70 is provided with electrical feed through terminals 72 and 74. Feed through 71 is provided with electric feed through terminals 73 and 75. Opposite electrical polarities are connected through such terminals 72-75 to the inner and outer surfaces of piezoelectric tube 30. One polarity, such as a positive polarity, is supplied from surface control unit 24 by way of conductor 74 and terminals 72 and 74 to a conductive coating on the inner surface of piezoelectric tube 30. Preferably, this inner conductive coating extends only along that portion of tube 30 that extends from near the edge of ring 31 to near the edge of ring 32 so as to maintain electrical isolation from rings 31 and 32. The other polarity, such as ground or a negative polarity, is supplied from surface control unit 24 by way of terminals 73 and 75 through a passageway 80 in ring member 31 to a conductive coating on the outer surface of piezoelectric tube 30. By applying such electrical polarities in the form of a single impulse to excite piezoelectric tube 30, such piezoelectric tube functions as a monopole acoustic transmitter radiating acoustic energy equally in all directions at its resonant frequency. By modulating such excitation in the form of a plurality of single impulses, the piezoelectric tube will continue to vibrate and emit acoustic energy at such resonant frequency. The radiation pattern of this acoustic energy can be enhanced by making the wall thickness of piezoelectric tube 30 less than ¼-inch and, preferably, about 1/16- to ⅛-inch. A thickness of less than about 1/16-inch would make the tube too fragile for borehole use.

It is a specific feature of the present invention that the acoustic transmitter resonate, under borehole logging operations, in the seismic frequency range of about a few hundred hertz, and more particularly, to generate a predominant acoustic energy tube wave with frequency in the seismic frequency range. To control this resonant frequency, there is provided at least one and, preferably, a plurality of passageways 80 through ring members 31 and 32 connecting the inner chamber 66 of the piezoelectric tube 30 to the area between piezoelectric tube 30 and boot 60. These passageways are shown in the form of small diameter holes drilled through the ring members 31 and 32 for purposes of structural integrity, although they could alternatively be drilled through the piezoelectric tube 30. Resonant frequency is established by controlling both the mass of the liquid filling the inner chamber 66 and the inertia of the liquid that fills the passageways 80 from the inner chamber 66. Firstly, the mass of the liquid in the inner chamber 66 can be changed by increasing or decreasing the volume of liquid enclosed within such chamber. Secondly, the inertia of the liquid in the passageways 80 can be changed by increasing or decreasing the volume of liquid in such passageways. However, since the diameter of such passageways must be small enough to allow dynamic pressure changes below the resonant frequency to enter the inner chamber 66 from outside the piezoelectric tube 30, control of resonant frequency is practically limited to changes in the combined lengths of such plurality of passageways. In one embodiment, the resonant frequency was established by the successive drilling of passageways 80 for a fixed size piezoelectric tube until the desired resonant frequency was obtained. In such embodiment, the volume of liquid within chamber 66 was selected as 3.69 cubic inches and the diameter of the passageways was selected as 1/32-inch. Four passageways 80, each 3/10-inch in length, were drilled through ring members 31 and 32 to cause said piezoelectric tube 30 to resonate at about 500 hertz when electrically excited as discussed above. At this 500 hertz resonant frequency, which is within the seismic frequency range, a large or predominant tube wave was excited in the borehole. This is illustrated in FIGS. 4A and 4B for a near receiver and far receiver, respectively. The predominant 500 hertz tube wave is labeled "T" in both FIGS. 4A and 4B, while an earlier arriving 7 kilohertz compressional wave is labeled "P" in both such FIGS.

The drilling of additional or fewer passageways 80 would decrease or increase the total liquid inertia, respectively, thereby increasing or decreasing resonant frequency, respectively.

The criticality of increasing the total length of the passageways 80 on the resonant frequency of the piezoelectric tube 30 can best be appreciated by reference to the analog electrical low-pass filter. A detailed description is provided in "Fundamentals of Acoustics", by L. E. Kinsler and A. R. Frey, John Wiley and Sons, April, 1958, pp. 198–206. A low-pass electrical filter includes an inductance and capacitance. The volume encased by the piezoelectric tube and the smaller diameter passageways is analogous to an acoustic filter. The liquid mass in the tube tank is analogous to a capacitance. The inertia of the liquid in the passageways is analogous to an inductance. The capacitance can be expressed as:

$$C_a = \frac{V}{\rho v^2} \quad (1)$$

and the inductance as:

$$L_a = \frac{\rho L_e}{A_c} \quad (2)$$

The frequency for such a low-pass filter is given by:

$$f = \frac{1}{2\pi \sqrt{L_a C_a}} \quad (3)$$

where,
$L_a$ is the inductance, or inertia,
$C_a$ is the capacitance or compliance,
$\rho$ is the density of the liquid,
$v$ is the velocity of sound in the liquid,
$A_c$ is the cross-sectional area of the passageways,
$L_e$ is the length of the passageways, and
$V$ is the volume encased by the piezoelectric tube.

It is a specific feature of the present invention to utilize the acoustic transmitter of the present invention for the generation, particularly, of low frequency tube waves. The arrival times of such low frequency tube waves at one or more spaced-apart receivers in a borehole logging tool provides an indication of tube wave slowness or inversely, velocity, which correlates with and provides a qualitative measure of formation permeability. This relationship between tube waves and permeability is probably based on the fact that the tube wave causes fluid displacement from the borehole into a formation when the tool is opposite to a zone of permeability. An increase in formation permeability causes an increase in both the amount of fluid displacement as well as the amount of energy dissipated by the tube wave in moving the fluid. Dissipation of tube wave energy tends to slow its travel time. Accordingly, measurements of tube wave slowness, or conversely velocity, can provide a qualitative indication of high and low permeability zones. Though not to be considered as part of the present invention, such measurement of the tube wave slowness may be as follows:

$$D_{tube}^{(dj)} = \frac{[I_{tube}(r_{far}dj) - I_{tube}(r_{near}dj)]*S}{D}$$

where,
$D_{tube}^{(dj)}$ = tube wave slowness at depth dj in us/ft;
dj = depth where the jth waveform is recorded;
$I_{tube}(r_{far}dj)$ = the digital sample number at the onset, i.e., arrival, of the tube wave in the wave train recorded by the far receiver at depth dj;
$I_{tube}(r_{near}dj)$ = the digital sample number at the onset, i.e., arrival, of the tube wave in the wave train recorded by the near receiver at depth dj;
s = sample rate in seconds; and
D = distance between receivers in feet.

Preferably, the near and far receivers are spaced about 15 and 20 feet, respectively, from the transmitter. For every foot along the borehole, a wave train of 10 msec duration will be recorded from each receiver. This wave train may be digitized, i.e., sampled, at, for example, 5 μsec. intervals.

By continuously computing and plotting $D_{tube}$ for each depth dj traversed by the logging tool, a log of tube wave slowness or, conversely, velocity, can be produced.

In addition to being utilized as a measure of formation permeability based on travel time, the low frequency tube waves recorded by a borehole logging system employing the acoustic transmitter of the present invention may also be used in connection with tube wave amplitude logging to provide a measure of formation permeability. By continuously plotting tube wave amplitude as the borehole logging tool traverses the borehole, a log of tube wave amplitude is produced. Formation permeability changes can be observed from tube wave amplitude changes along the borehole.

Having now described in detail the low frequency acoustic transmitter of the present invention and a method for its use in generating and recording low frequency tube waves in a borehole in conjunction with tube wave travel time or amplitude logging for formation permeability measurements, it is to be understood various modifications and alterations may be made by those skilled in the art without departing from the spirit and scope of the invention as set forth in the appended claims.

I claim:

1. An acoustic transmitter for a borehole logging tool, comprising:
   (a) a tube of piezoelectric material,
   (b) ring members for sealing both ends of said tube,
   (c) liquid for filling said tube,
   (d) a pliable boot surrounding said tube,
   (e) a plurality of passageways between the inside of said tube and the inner surface of said boot which are filled with said liquid, said passageways having (i) diameters that allow the transmission of static pressure changes, but not dynamic pressure changes above a resonant frequency, into said tube, and (ii) combined lengths that control the inertia of the liquid inside said passageways such that said total inertia, in combination with the mass of the liquid encased by said piezoelectric tube, controls the resonant frequency for said piezoelectric tube,
   (f) electrical contacts to the inner and outer surfaces of said tube to which differing electrical polarities are applied, and
   (g) means for modulating the application of said differing electrical polarities to said tube to excite said tube to vibrate, thereby generating an acoustic energy wave in subsurface formations surrounding a borehole in which the borehole logging tool is placed.

2. The acoustic transmitter of claim 1 wherein the number of said plurality of passageways is selected to provide a predominant acoustic energy tube wave in the seismic frequency range.

3. The acoustic transmitter of claim 2 wherein said acoustic energy tube wave is in the order of 500 hertz.

4. The acoustic transmitter of claim 2 wherein said acoustic transmitter also provides an acoustic compressional wave below 10 kilohertz.

5. The acoustic transmitter of claim 1 wherein said passageways are no greater than about 1/32-inch in diameter to allow static pressure changes, but not dynamic pressure changes, above a resonant frequency into said piezoelectric tube.

6. The acoustic transmitter of claim 5 having four of said passageways with lengths of about 3/10-inch provide a resonant frequency of about 500 hertz with a liquid volume of about 3.69 cubic inches within said tube.

7. The acoustic transmitter of claim 1 wherein the thickness of said piezoelectric tube is less than about ¼-inch.

8. The acoustic transmitter of claim 1 wherein the thickness of said piezoelectric tube is in the order of 1/16- to ⅛-inch.

9. An acoustic transmitter for a borehole logging tool, comprising:
   (a) a tube of piezoelectric material,
   (b) ring members for sealing the ends of said piezoelectric tube, said ring members each having a portion which extends into said piezoelectric tube and a portion which abuts against the end of said piezoelectric tube,
   (c) a pliable boot surrounding said piezoelectric tube, said boot extending beyond the ends of said piezoelectric tube and affixed to the outer surface of those portions of said ring members which abut against the ends of said piezoelectric tube,
   (d) liquid for filling the inside of said piezoelectric tube,
   (e) at least one passageway through those portions of said ring members which abut against the ends of said piezoelectric tube for providing fluid communication between the inside of said piezoelectric tube and said boot, said passageway allowing static pressure changes, but not dynamic pressure changes, into said piezoelectric tube,
   (f) means for mechanically isolating said piezoelectric tube from said ring members,
   (g) means for applying differing electrical polarities to the inner and outer surfaces of said piezoelectric tube,
   (h) means for modulating the application of said differing electrical polarities to said piezoelectric tube to excite said piezoelectric tube to resonate, thereby generating an acoustic energy wave in subsurface formations surrounding a borehole in which the borehole logging tool is placed.

10. The acoustic transmitter of claim 9 wherein the inertia of the liquid in said passageway and the mass of the liquid in said piezoelectric tube are selected to provide a dominant tube wave in the seismic frequency range.

11. The acoustic transmitter of claim 9 wherein said isolating means comprises:
    (a) first peripheral grooves in the portions of said ring members which extend into said piezoelectric tube,
    (b) first O-rings in said first peripheral grooves for isolating the inner surface of said piezoelectric tube from said ring members,
    (c) second peripheral grooves in the portions of said ring members which abut against the ends of said piezoelectric tube, and
    (d) second O-rings in said second peripheral grooves for isolating the ends of said piezoelectric tube from said ring members.

* * * * *